(12) United States Patent
Evers et al.

(10) Patent No.: US 11,516,043 B2
(45) Date of Patent: Nov. 29, 2022

(54) MONOLITHIC HIGH-VOLTAGE TRANSCEIVER CONNECTED TO TWO DIFFERENT SUPPLY VOLTAGE DOMAINS

(71) Applicant: NXP B.V., Eindhoven (NL)

(72) Inventors: Rainer Evers, Hamburg (DE); Gerald Kwakernaat, Malden (NL); Matthias Berthold Muth, Stelle (DE)

(73) Assignee: NXP B.V., Eindhoven (NL)

( * ) Notice: Subject to any disclaimer, the term of this patent is extended or adjusted under 35 U.S.C. 154(b) by 0 days.

(21) Appl. No.: 17/248,675

(22) Filed: Feb. 2, 2021

(65) Prior Publication Data

US 2021/0250199 A1  Aug. 12, 2021

(30) Foreign Application Priority Data

Feb. 6, 2020  (EP) ..................................... 20155913

(51) Int. Cl.
*H04L 12/40* (2006.01)
*B60R 16/02* (2006.01)

(52) U.S. Cl.
CPC ........ *H04L 12/40013* (2013.01); *B60R 16/02* (2013.01); *H04L 12/40169* (2013.01); *H04L 2012/40215* (2013.01); *H04L 2012/40241* (2013.01); *H04L 2012/40273* (2013.01)

(58) Field of Classification Search
CPC ......... H04L 12/40013; H04L 12/40169; H04L 2012/40215; H04L 2012/40241; H04L 2012/40273; B60R 16/02
See application file for complete search history.

(56) References Cited

U.S. PATENT DOCUMENTS

| | | | |
|---|---|---|---|
| 10,498,396 B1 | 12/2019 | Frey et al. | |
| 2006/0077047 A1* | 4/2006 | Zalitzky | H04B 3/54 340/12.32 |
| 2006/0290404 A1 | 12/2006 | Law | |
| 2007/0208470 A1* | 9/2007 | Itabashi | H04L 12/4135 701/1 |
| 2013/0340860 A1* | 12/2013 | Ogawa | G05D 7/0617 137/487.5 |

(Continued)

FOREIGN PATENT DOCUMENTS

CN  108924025 A  11/2018

OTHER PUBLICATIONS

US 3,571,093 A, 03/1971, Van de Beek (withdrawn)

(Continued)

*Primary Examiner* — Henry Tsai
*Assistant Examiner* — Harry Z Wang

(57) ABSTRACT

A transceiver has a first interface supplied by a first supply voltage to interface with external devices operating in a first supply domain and a second interface supplied by a second supply voltage and adapted to interface to an external communication bus operating in a second supply domain. The transceiver has a first internal communication link, which is adapted to transfer transmit data generated by an external device operating in the first supply domain, from the first interface to the second interface, and a second internal communication link, which is adapted to transfer transmit data be supplied from the external communication bus operating in the second supply domain from the second interface to the first interface.

17 Claims, 6 Drawing Sheets

(56) References Cited

U.S. PATENT DOCUMENTS

| | | | |
|---|---|---|---|
| 2015/0029626 A1 | 1/2015 | Yang et al. | |
| 2015/0039801 A1* | 2/2015 | Mori | G06F 13/40 |
| | | | 710/305 |
| 2017/0329773 A1* | 11/2017 | Fieglein | G06Q 30/0271 |
| 2019/0385057 A1* | 12/2019 | Litichever | H04L 63/14 |
| 2020/0097433 A1* | 3/2020 | Qi | G06F 13/4068 |

OTHER PUBLICATIONS

"Current loop", Wikipedia, 5 pgs., retrieved from the Internet Feb. 9, 2021 at: https://en.wikipedia.org/wiki/Current_loop.

"Low-voltage differential signaling", Wikipedia, 7 pgs., retreived from the internet Feb. 9, 2021 at: https://en.wikipedia.org/wiki/Low-voltage_differential_signaling.

"TCAN1043xx-Q1 Low-Power Fault Protected CAN Transceiver with CAN FD and Wake", Texas Instruments, 51 pgs. retreived from the internet at: https://www.ti.com/lit/ds/symlink/tcan1043-q1.pdf?ts=1612216194937&ref_url=https%253A%252F%252Fwww.google.com%252F (May 2018).

"Galvanically isolated high-speed CAN transceiver—TJA1052i", Product data sheet. Rev. 4, NXP, 27 pgs., retreived from the internet at: https://www.nxp.com/praducts/interfaces/can-transceivers/isolation-can-transceivers/galvanically-isolated-high-speed-can-transceiver:TJF1052IT (May 2016).

\* cited by examiner (State of the art)

MONOLITHIC HIGH-VOLTAGE TRANSCEIVER CONNECTED TO TWO DIFFERENT SUPPLY VOLTAGE DOMAINS

CROSS-REFERENCE TO RELATED APPLICATIONS

This application claims the priority under 35 U.S.C. § 119 of European patent application no. 20155913.5, filed on Feb. 6, 2020, the contents of which are incorporated by reference herein.

TECHNICAL AREA

The invention relates to a transceiver device for interfacing between at least two different voltage domains, and to a method of interfacing between at least two different voltage domains.

BACKGROUND TO THE INVENTION

In the automotive industry, among others striving for $CO_2$ emission reduction, Mild Electric Hybrid Vehicles (MHEVs) have been introduced, which have two board net voltage domains, in particular 12V or 24V on the one hand and 48V on the other hand. In such MHEVs, the electric high-power applications including an electric motor, such as e.g. an electric starter generator, of the vehicle, which are typically operative in the range of 1 to 15 kW, are connected to the 48V board net.

The Controller Area Network (CAN) bus is often used in automotive and industrial automation applications. The CAN bus system was developed in 1983 by the company Bosch and presented publically in 1986 together with the company Intel. The CAN bus has evolved to a bus standard in automotive and industrial automation applications, and is described in ISO 11898. A CAN bus can support bit-rates up to 8 Mbps in the case of the extension CAN FD, which was developed in 2011 and released in 2012 by the company Bosch, if the network topology is correctly terminated.

In MHEVs, 12V board net electronic control units (ECUs) and 48V board net units are connected to a same Controller Area Network (CAN) bus network. To enable such mixed 12V/48V CAN networks, a CAN transceiver of ECUs operating at 48V must tolerate common mode difference and have provisions to limit a maximum potential voltage on CAN bus lines and reverse currents into CAN bus lines.

In mixed 12V/48V CAN networks, ECUs operating at 48V typically have four power connector pins:

$V_{BN48}$: 48V board net connector (e.g. Kl. 40),
$GND_{48}$: ground connector of 48V board net (e.g. Kl. 41),
$V_{BN12/24}$: 12V or 24V board net connector (e.g. Kl. 30), and
$GND_{12/24}$: ground connector of 12V or 24V board net (e.g. Kl. 31).

A 48V CAN transceiver is typically connected between the 12V/24V voltage supply domain and the 48V voltage supply domain, as is illustrated in FIG. 1 and as is described further below.

In MHEVs, the grounds of both board net domains (supply voltage domains) are somewhat connected. The position of this shared ground connections depends on the car manufacturer. Although the grounds are somewhere connected, automotive transients in combination with the (long) wiring harness cause ground offsets and common mode transients between the ECU ground pins, viz. $GND_{12/24}$ and $GND_{48}$. This could result in communication disturbances. Furthermore, loss of ground scenarios are possible, which can lead to high voltage differences between $GND_{12/24}$ and $GND_{48}$.

To overcome these problems in current 48V ECUs, CAN transceivers with high-voltage galvanic isolation are used to handle with, or connect to, both board net domains. As galvanic isolation barrier, the following methods are used: (voltage) transformer, capacitor, or optocoupler. All these known galvanic isolation barriers are expensive solutions, because such CAN transceivers consist of multiple integrated circuit dies in one package (multi-chip module package). Or even worse, a discrete solution comprising a separate CAN transceiver device and one or more separate galvanic isolation devices may be applied.

Although the above description of the background of the invention relates to state of the art ECUs operating at 48V, 48V CAN transceivers, and mixed 12V/48V or 24V/48V CAN networks, which have been developed in the automotive industry in respect of MHEVs, and the present invention—as will be disclosed in the following—has been developed initially in this field of technology, the present invention can be generalized to be applicable in interfacing to other bus systems, such as a Local Interconnect Network (LIN) bus (as described in ISO 17987) and a FlexRay bus (as described in ISO 17458-1 to 17458-5), or more generally to a communication medium, including e.g. Ethernet, in interfacing between supply voltage domains different having different supply voltages than 12/24V and 48V (as used in the automotive industry).

SUMMARY OF THE INVENTION

The present invention relates to a transceiver device for interfacing between at least two different voltage domains, and to a method of interfacing between at least two different voltage domains.

It is a general object of the present invention to provide a device for digitally interfacing and a method of digitally interfacing between a high-voltage supply domain and a low-voltage supply domain, which reduces or eliminates the impact(s) of ground offset, common mode transients and loss of ground scenarios without galvanic isolation, so as to enable a solution with a single integrated circuit die. Further objects of the present invention comprise a provision of common mode tolerance, and measures against high voltages and currents crossing from one domain to the other.

This object is solved by the subjects having the features according to the independent patent claims. Preferred and advantageous embodiments are described in the dependent claims. In particular, this object is solved by a transceiver device according to the appended independent claim 1, and by a method according to the appended independent claim 19. Further embodiment examples of the invention are described in the dependent claims.

According to a first exemplary embodiment of the present invention, there is provided a transceiver device for interfacing between at least two different voltage domains, namely a first supply voltage domain having a higher first supply voltage and a second supply voltage domain having a lower second supply voltage, wherein the transceiver device has:

a first interface, which is supplied by the first supply voltage and is adapted to interface to at least one external first digital device operating in the first supply voltage domain;

a second interface, which is supplied by the second supply voltage and is adapted to interface to an external communication bus operating in the second supply voltage domain;

a first internal communication link, which is adapted to transfer transmit data, which are generatable (or can be generated) by the external first digital device operating in the first supply voltage domain, from the first interface to the second interface, and a second internal communication link, which is adapted to transfer transmit data, which are supplyable (or can be supplied, or can be provided) from the external communication bus operating in the second supply voltage domain, from the second interface to the first interface. Herein, in particular, the receive data may originate from a device that operates in the second supply voltage domain and is connected to the communication bus.

By providing the first and second internal communication for transmitting both transmit and receive data, for duplex transmission, the impacts of ground offset, common mode transients, and loss of ground scenarios can be solved without provision of galvanic isolation. This in turn enables the following advantageous embodiment examples.

The transceiver device according to the first exemplary embodiment of the present invention may have more than one first and second internal communication links, for example, a further first and second internal communication link for transmitting a device mode indicating signal, and a still further first and second internal communication link for transmitting a device status information signal.

In an advantageous embodiment example of the present invention, the transceiver device, including the first interface, the second interface, the first internal communication link, and the second internal communication link, and in particular further first and second internal communication links, may be embodied as a monolithic integrated circuit. In a particular advantageous embodiment example thereof, the monolithic integrated circuit may be implemented in silicon-on-insulator (SOI) technology.

In an embodiment example of the present invention, the transceiver device may further have at least two ground pins, including a first ground pin adapted to be connected to a ground potential of the first voltage supply domain, and a second ground pin adapted to be connected to a ground potential of the second voltage supply domain.

In an embodiment example of the present invention, the transceiver device may further have a common mode and ground offset range that is in a range starting from more than approximately ±3V, but not exceeding approximately ±70V.

In an embodiment example of the present invention, the first supply voltage is substantially nominal 48V or greater. In an embodiment example of the present invention, the second supply voltage is substantially nominal 12V or substantially nominal 24V.

In an embodiment example of the present invention, the first interface may have: a transmit data input adapted to receive the transmit data, e.g. from the first digital device operating in the first supply voltage domain, and a receive data output adapted to transmit the receive data, e.g. to a second digital device operating in the first supply voltage domain.

In a further development of this embodiment example, the first and the second digital device operating in the first supply voltage domain may be a same digital device, and/or the first and the second digital device operating in the first supply voltage domain may together form a microcontroller unit.

In an embodiment example of the present invention, the second interface may have: at least one communication bus pin adapted to transmit the transmit data to and/or receive the receive data from the external communication bus operating in the second supply voltage domain.

In a further development of this embodiment example, the external communication bus operating in the second supply voltage domain may be selected from the group consisting of a CAN bus, a Flexray bus, a LIN bus, and an Ethernet.

In a first particular embodiment example of the present invention, in respect of the transmission of transmit data and receive data, respectively, the first and the second internal communication link may be based on differential voltage transmission.

In a second particular embodiment example of the present invention, which is alternative to the first particular embodiment example of the present invention as described hereinbefore, in respect of the transmission of transmit data and receive data, respectively, the first and the second internal communication link are based on digital current loop transmission.

By embodying the first and the second internal communication link either as being based on differential voltage transmission or being are based on digital current loop transmission, the internal communication links provide tolerance to ground offset, common mode transients and minimize reverse currents into the lines of the second (lower) supply voltage domain in loss of ground scenarios.

In a further development of the first particular embodiment example of the present invention, the first internal communication link may comprise a first differential voltage transmitter and a first differential voltage receiver. The first differential voltage transmitter may operate with reference to, in particular may be supplied by, the first supply voltage domain, and may be adapted to receive, via the first interface, the transmit data generated by the first digital device operating in the first supply voltage domain, and to generate and output a first differential voltage signal for transmitting the transmit data. The first differential voltage receiver may operate with reference to, in particular is supplied by, the second supply voltage domain, and may be adapted to receive the differential voltage signal transmitted by the first differential voltage transmitter, and to transmit a first single-ended digital signal for transmitting the transmit data, via the second interface, to the external communication bus operating in the second supply voltage domain.

In a corresponding further development of the first particular embodiment example of the present invention, the second internal communication link may comprise a second differential voltage transmitter and a second differential voltage receiver. The second differential voltage transmitter may operate with reference to, in particular may be supplied by, the second supply voltage domain, and may be adapted to receive, via the second interface, the receive data supplyable from the external communication bus operating in the second supply voltage domain, and to generate and output a second differential voltage signal for transmitting the receive data. The second differential voltage receiver may operate with reference to, in particular may be supplied by, the first supply voltage domain, and may be adapted to receive the differential voltage signal transmitted by the second differential voltage transmitter, and to transmit a second single-ended digital signal for transmitting the receive data, via the first interface, to the second digital device operating in the first supply voltage domain.

In a corresponding still further development of the first particular embodiment example of the present invention, the first differential voltage transmitter may have a first switch-based H-bridge, which may operate with reference to, in particular may be supplied by, the first supply voltage domain, and the first differential voltage receiver may have a first voltage divider resistor ladder and a first comparator, which operates with reference to, in particular is supplied by, the second supply voltage domain. The first voltage divider resistor ladder may have, connected in series, a first resistor having substantially a second resistance value, a second resistor having substantially a first resistance value, a third resistor having substantially the first resistance value, and a fourth resistor having substantially the second resistance value. The ratio between the first resistance value and the second resistance value can be determined from the following equation:

$$(R2/R1)=(V1/V2)-1,$$

wherein R1 is the first resistance value, R2 is the second resistance value, V1 is the nominal value of the first supply voltage, and V2 is the nominal value of the second supply voltage.

The first differential voltage signal, as output from the first switch-based H-bridge, may be applied across the series connection consisting of the first to fourth resistor. A first auxiliary differential voltage signal may be output by the first voltage divider resistor ladder from between a first connection point connected between the first and the second resistor and a second connection point connected between the third and the fourth resistor. A third connection point connected between the second and the third resistor may be connected to the second domain ground. The first comparator has an input, an inverting input, and an output, and may receive the first auxiliary differential voltage signal as applied to its input and to its inverting input, and may output from its output the first single-ended digital signal.

In a corresponding still further development of the first particular embodiment example of the present invention, the second differential voltage transmitter may have a second switch-based H-bridge, which may operate with reference to, in particular is supplied by, the second supply voltage domain, and the second differential voltage receiver may have a second voltage divider resistor ladder and a second comparator, which may operate with reference to, in particular is supplied by, the first supply voltage domain. The second voltage divider resistor ladder may have, connected in series, a first resistor having substantially a second resistance value, a second resistor having substantially a first resistance value, a third resistor having substantially the first resistance value, and a fourth resistor having substantially the second resistance value. The ratio between the first resistance value and the second resistance value can be determined from the following equation:

$$(R2/R1)=(V1/V2)-1,$$

wherein R1 is the first resistance value, R2 is the second resistance value, V1 is the nominal value of the first supply voltage, and V2 is the nominal value of the second supply voltage.

The second differential voltage signal, as output from the second switch-based H-bridge, may be applied across the series connection consisting of the first to fourth resistor. A second auxiliary differential voltage signal may be output by the second voltage divider resistor ladder from between a first connection point connected between the first and the second resistor and a second connection point connected between the third and the fourth resistor. A third connection point connected between the second and the third resistor may be connected to the first domain ground. The second comparator has an input, an inverting input, and an output, and may receive the second auxiliary differential voltage signal as applied to its input and to its inverting input, and may output from its output the second single-ended digital signal.

As stated already above, in a second particular embodiment example of the present invention, which is alternative to the first particular embodiment example as described hereinbefore, in respect of the transmission of transmit data and receive data, respectively, the first and the second internal communication link are based on digital current loop transmission.

In a further development of the second particular embodiment example of the present invention, the first internal communication link may comprise a first transconductance transmitter and a first digital differential current loop receiver. The first transconductance transmitter may operate with reference to, in particular may be supplied by, the first supply voltage domain, and may be adapted to receive, via the first interface, a first input voltage for carrying the transmit data generated by the first digital device operating in the first supply voltage domain, and to convert the first input voltage into, and output, a first differential current output for transmitting the transmit data. The first digital differential current loop receiver may operate with reference to, in particular may be supplied by, the second supply voltage domain, and may be adapted to receive the first differential current output, and to convert this into, and output, a first single-ended digital signal for transmitting the transmit data, via the second interface, to the external communication bus operating in the second supply voltage domain.

In a corresponding further development of the second particular embodiment example of the present invention, the second internal communication link may comprise a second transconductance transmitter and a second digital differential current loop receiver. The second transconductance transmitter may operate with reference to, in particular may be supplied by, the second supply voltage domain, and may be adapted to receive, via the second interface, a second input voltage for carrying the receive data supplyable from the external communication bus operating in the second supply voltage domain, and to convert the second input voltage into, and output, a second differential current output for transmitting the receive data. The second digital differential current loop receiver may operate with reference to, in particular may be supplied by, the first supply voltage domain, and may be adapted to receive the second differential current output, and to convert this into, and output, a second single-ended digital signal for transmitting the receive data, via the first interface, to the second digital device operating in the first supply voltage domain.

In the corresponding still further development of the second particular embodiment example of the present invention, the first transconductance transmitter has a first branch having, connected in series, a first current source adapted to generate a first electric current and a first switch, and a second branch having, connected in series, a second current source adapted to generate a second electric current and a second switch. The first branch and the second branch are connected in parallel between a first connection point and a second connection point. The second electric current is directed opposite to the first electric current. The first connection point represents a first output that connects to a first line of the first internal communication link, and the second connection point represents a second output that connects to a second line of the first internal communication link.

The first digital differential current loop receiver has a first voltage divider resistor ladder and a first differential current loop voltage comparator, which operates with reference to, in particular is supplied by, the second supply voltage domain. The first voltage divider resistor ladder has, connected in series, a first resistor having substantially a second resistance value, a second resistor having substantially a first resistance value, a third resistor having substantially the first resistance value, and a fourth resistor having substantially the second resistance value.

The first differential current, I1_loop, signal, as output from the first transconductance transmitter, is applied across the series connection consisting of the first to fourth resistor. A first auxiliary differential voltage, V1_aux, signal is output by the first voltage divider resistor ladder from between a first connection point connected between the first and the second resistor and a second connection point connected between the third and the fourth resistor. A third connection point connected between the second and the third resistor may be connected to the second domain ground. The first differential current loop voltage comparator has an input, an inverting input, and an output, and receives the first auxiliary differential voltage signal as applied to its input and to its inverting input, and outputs from its output the first single-ended digital signal.

A first voltage, V1, generated by the first differential current, I1_loop, flowing across the series connection consisting of the first to fourth resistors and the first auxiliary voltage, V1_aux, can be determined from the following equations:

$$V1=2*(R1+R2)*I1\_loop, \text{ and}$$

$$V1\_aux=2*R1*I1\_loop,$$

wherein R1 is the first resistance value, and R2 is the second resistance value.

The first transconductance transmitter has a first branch having, connected in series, a first current source adapted to generate a first electric current and a first switch, and a second branch having, connected in series, a second current source adapted to generate a second electric current and a second switch. The first branch and the second branch are connected in parallel between a first connection point and a second connection point. The second electric current is directed opposite to the first electric current. The first connection point represents a first output that connects to a first line of the second internal communication link, and the second connection point represents a second output that connects to a second line of the second internal communication link.

The second digital differential current loop receiver has a second voltage divider resistor ladder and a second differential current loop voltage comparator, which operates with reference to, in particular is supplied by, the second supply voltage domain. The second voltage divider resistor ladder has, connected in series, a first resistor having substantially a second resistance value, a second resistor having substantially a first resistance value, a third resistor having substantially the first resistance value, and a fourth resistor having substantially the second resistance value.

The second differential current, I2_loop, signal, as output from the second transconductance transmitter, is applied across the series connection consisting of the first to fourth resistor. A second auxiliary differential voltage, V2_aux, signal is output by the second voltage divider resistor ladder from between a first connection point connected between the first and the second resistor and a second connection point connected between the third and the fourth resistor. A third connection point connected between the second and the third resistor may be connected to the first domain ground. The second differential current loop voltage comparator has an input, an inverting input, and an output, and receives the first auxiliary differential voltage signal as applied to its input and to its inverting input, and outputs from its output the first single-ended digital signal.

A second voltage, V2, generated by the second differential current, I2_loop, flowing across the series connection consisting of the first to fourth resistors and the second auxiliary voltage, V2_aux, can be determined from the following equations:

$$V2=2*(R1+R2)*I2\_loop, \text{ and}$$

$$V2\_aux=2*R1*I2\_loop,$$

wherein R1 is the first resistance value, and R2 is the second resistance value.

According to a second exemplary embodiment example of the present invention, there is provided an electrical network system, in particular an electronic control unit (ECU), having a higher first supply voltage domain and a lower second supply voltage domain, and a transceiver device according to the first exemplary embodiment example of the present invention and as described above, for interfacing between the first and the second supply voltage domains.

According to a third exemplary embodiment example of the present invention, there is provided a vehicle having an electrical network system, in particular an electronic control unit (ECU), according to the second exemplary embodiment example of the present invention.

According to a fourth exemplary embodiment example of the present invention, there is provided a method of interfacing between at least two different voltage domains, namely a first supply voltage domain having a higher first supply voltage and a second supply voltage domain having a lower second supply voltage, wherein the method uses a transceiver device having a first interface, a second interface, a first internal communication link, and a second internal communication link. The method has the following steps:
  supplying the first interface by the first supply voltage, and interfacing by the first interface to at least one external first digital device operating in the first supply voltage domain;
  supplying the second interface by the second supply voltage, and interfacing by the second interface to an external communication bus operating in the second supply voltage domain;
  transferring transmit data, which are generated by the external first digital device operating in the first supply voltage domain, through the first interface, via the first internal communication link to the second interface, and in particular further to the external communication bus operating in the second supply voltage domain; and
  transferring receive data, which are supplied from the external communication bus operating in the second supply voltage domain, through the second interface, via the second internal communication link to the first interface, and in particular further to an external second digital device operating in the first supply voltage domain. Herein, in particular, the receive data may originate from a device that operates in the second supply voltage domain and is connected to the communication bus.

In a first particular embodiment example of the present invention, the method may further comprise operating the first and the second internal communication link in a differential voltage transmission mode.

In a second particular embodiment example of the present invention, which is alternative to the first particular embodiment example of the present invention, the method may further comprise operating the first and the second internal communication link in a digital current loop transmission mode.

In an embodiment example of the present invention, the transceiver device, including the first interface, the second interface, the first internal communication link, and the second internal communication link, may be embodied as a monolithic integrated circuit. In an advantageous embodiment example thereof, the monolithic integrated circuit may be implemented in silicon-on-insulator (SOI) technology.

In an embodiment example of the present invention, the transceiver device may further have at least two ground pins, including a first ground pin adapted to be connected to a ground potential of the first voltage supply domain, and a second ground pin adapted to be connected to a ground potential of the second voltage supply domain.

In an embodiment example of the present invention, the transceiver device may further have a common mode and ground offset range that is in a range starting from more than approximately ±3V, but not exceeding approximately ±70V.

In an embodiment example of the present invention, the first supply voltage is substantially nominal 48V or greater. In an embodiment example of the present invention, the second supply voltage is substantially nominal 12V or substantially nominal 24V.

BRIEF DESCRIPTION OF THE DRAWINGS

In the following, exemplary embodiment examples of the present invention are described in detail with reference to the following drawings.

For reasons of conciseness, features, which will be described with respect a particular figure, may not be described again, if they appear likewise or similarly in another figure. Similar or identical elements in different figures are provided with same reference numerals.

FIG. 1 shows a schematic block diagram of an electrical network system, e.g. an electronic control unit (ECU), 10 having a first supply voltage domain 12, a second supply voltage domain 14, and a transceiver device 96, which has a galvanic isolation barrier 98 in a conventional manner, for interfacing between the first and the second supply voltage domain 12, 14.

Figure 1:
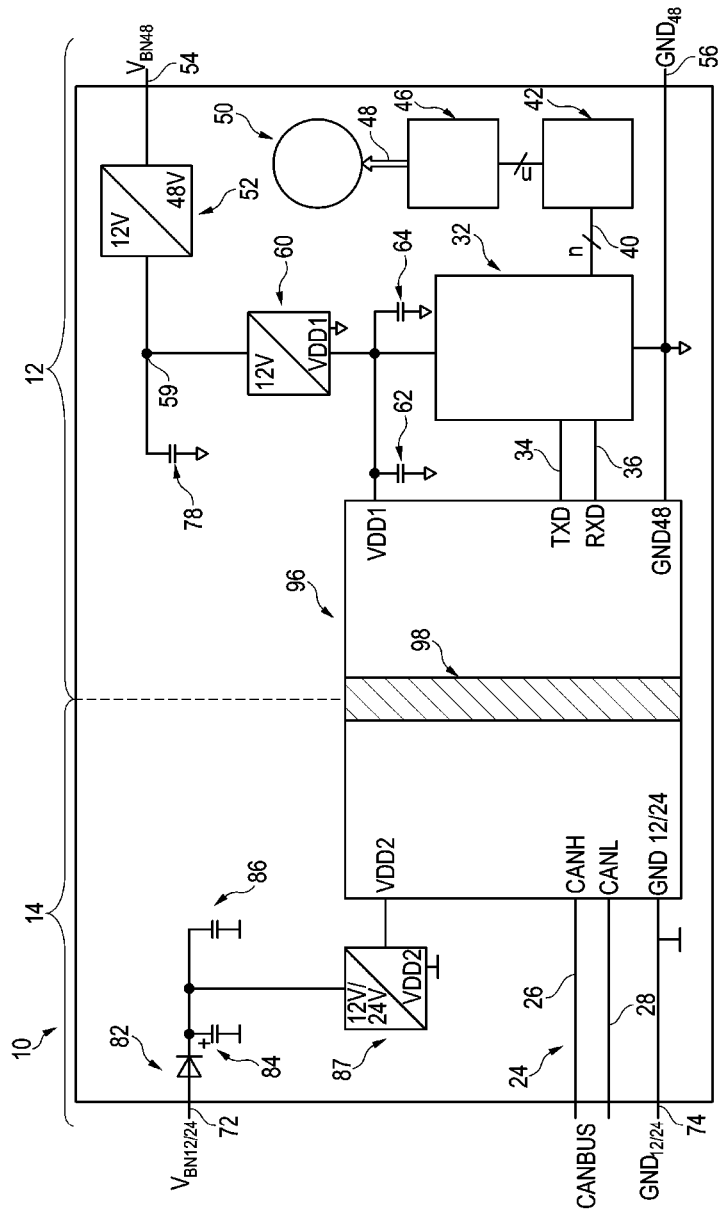
FIG. 1 shows a schematic block diagram of an electrical network system, e.g. an electronic control unit (ECU), having a first supply voltage domain, a second supply voltage domain, and a transceiver device, which has a galvanic isolation barrier in a conventional manner, for interfacing between the first and the second supply voltage domain.

By way of example, the electrical network system 10 is a mixed 12V/48V or 24V/48V CAN network in a MHEV (not shown), the transceiver device 96 is a 48V CAN transceiver of the MHEV, the first supply voltage is substantially nominal 48V and the second supply voltage is substantially nominal 12V or 24V in the MHEV. The 48V CAN transceiver 96 has, in a conventional manner, a galvanic isolation barrier 98, which may be embodied according to one of the following methods: (voltage) transformer, capacitor, or optocoupler.

The first supply voltage domain (or high-voltage supply domain) 12 is supplied by a first (or high) supply voltage via a pair of pins 54, 56, viz. a high-voltage/first domain supply 54 (e.g. nominal 48V car board net supply, often referred to as $V_{BN48}$) and a high-voltage/first domain ground (e.g. ground connector of 48V car board net, often referred to as $GND_{48}$).

The second supply voltage domain (or low-voltage supply domain) 14 is supplied by a second (or low) supply voltage via a pair of pins 72, 74, viz. a low-voltage/second domain supply 72 (e.g. nominal 12V or 24V car board net supply, often referred to as $V_{BN12/24}$) and a low-voltage/second domain ground 74 (e.g. ground connector of 12V or 24V car board net/$GND_{12/24}$).

The electrical network system 10 of the MHEV comprises, in the first (high) supply voltage domain 12, an electric motor, such as e.g. an electric starter generator, 50, a first voltage converter 52 (viz. 48V/12V), a second voltage converter (viz. 12V/VDD1), a microcontroller unit 32 for controlling among others the operation of the electric motor 50 via a driving line comprising a gate driver unit (GDU) 42, a power stage 46 for driving the electric motor 50, and the electric motor 50.

A 48V input of the a first voltage converter 52 is connected to the a high-voltage/first domain supply 54 ($V_{BN48}$). A 12V output of the first voltage converter 52 is connected to a first connection point 59, which is also connected to a 12V input of the second voltage converter 60. A VDD1 (for example, 5V) output of the second voltage converter 60 is connected to a voltage supply input of the microcontroller 32. The microcontroller 32 outputs, among others, control signals via a first control signal line 40 to a control input of the GDU 42. The GDU 42 outputs, control signals via a second control signal line 44 to a control input of the power stage 46. The power stage 46 outputs via a drive signal line 48 high-power driving voltages and driving currents for driving the electric motor 50 of the MHEV.

The second supply voltage domain (or low-voltage supply domain) 14 is supplied by a second (or low) supply voltage via a pair of pins 72, 74, viz. a low-voltage/second domain supply 72 (e.g. nominal 12V or 24V car board net supply, often referred to as $V_{BN12/24}$) and a low-voltage/second domain ground 74 (e.g. ground connector of 12V or 24V car board net/$GND_{12/24}$).

The electrical network system 10 of the MHEV comprises, in the second (low) supply voltage domain 14, a CAN bus 24, which comprises a CAN bus high line 26 and a CAN bus low line 28, for connecting to various ECUs and devices connected to the second (low) supply voltage domain 14.

The transceiver device 96, which is embodied in FIG. 1 as a conventional 48V CAN transceiver, as such, comprises in the first (high) voltage domain 12 the following pins:VDD1, TXD, RXD, and GND48. Furthermore, the conventional 48V CAN transceiver, as such comprises in the second (low) voltage domain 14 the following pins: VDD2, CANH, CANL, and GND12. These pins are similar in function, and correspond to the pins of the 48V CAN transceiver shown in FIG. 2, which exemplifies a transceiver device 100 according to the invention, and which is described further below with reference to FIG. 2.

The conventional 48V CAN transceiver 96 has a galvanic isolation between the pins in the first (high) voltage domain 12 and the pins in the second (low) voltage domain 14. The galvanic isolation barrier may be implemented to comprise one of a galvanic isolation transformer, a galvanic isolation capacitor, or a galvanic isolation optocoupler.

DETAILED DESCRIPTION OF PREFERRED EMBODIMENTS OF THE INVENTION

Figure 2:
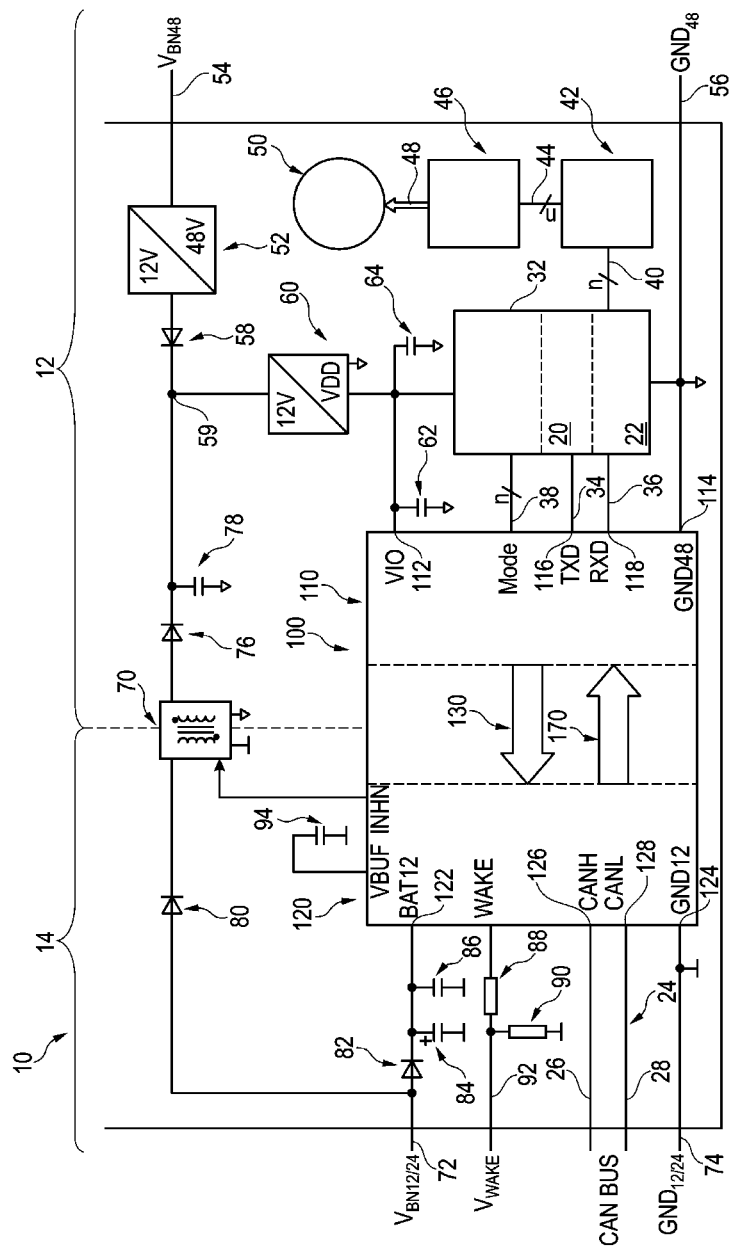
FIG. 2 shows a schematic block diagram of an electrical network system, e.g. an electronic control unit (ECU), according to the present invention, wherein the system has a first supply voltage domain, a second supply voltage domain, and a transceiver device according to the present invention for interfacing between the first and the second supply voltage domain.

FIG. 2 shows a schematic block diagram of an electrical network system, e.g. an electronic control unit (ECU), 10 according to the present invention, wherein the electrical network system 10 has a first supply voltage domain 12, a second supply voltage domain 14, and a transceiver device 100 according to the present invention for interfacing between the first and the second supply voltage domain 12, 14.

The electrical network system 10 shown in FIG. 2 corresponds to the electrical network system 10 shown in FIG. 1, with a first exception that the conventional transceiver device 96, which is embodied as a 48V CAN transceiver in FIG. 1, is replaced by a transceiver device 100 according to the invention, which is embodied in FIG. 2 likewise as a 48V CAN transceiver, and however according to the invention, and a second exception that the transceiver device 100 has some additional functional pins both in the first and the second supply voltage domain, a third exception that the electrical network system 10 has some additional elements that are described below.

Contrary to the transceiver (viz. the 48V CAN transceiver) 96 shown in FIG. 1 and instead of having a galvanic isolation barrier 98, the transceiver device 100 according to the present invention as illustrated in FIG. 2 has a first interface 110, a second interface 120, a first internal communication link 130 and a second internal communication link 170, wherein the internal communication links 130 and 170 bridge between the first and the second interface 110, 120.

There may be more than one first and second internal communication links, for example, a further first and second internal communication link for transmitting a mode signal (or a device mode indicating signal), for example from the second voltage supply domain to the first voltage supply domain, a still further first and second internal communication link for transmitting a wake signal, for example from the first voltage supply domain to the second voltage supply domain, and a still further first and second internal communication link for transmitting a device status information signal.

The first (high) supply voltage domain 12 and the second (low) supply voltage domain 14 are interfaced, independently and outside of the transceiver device 100, by a galvanic isolated flyback converter 70. A second (low) supply voltage terminal of the galvanic isolated flyback converter 70 is supplied by (or connected to) the low-voltage/second domain supply 72 via a fourth diode 80. A first (high) supply voltage terminal of the galvanic isolated flyback converter 70 connects via a second diode 76 to the first connection point 59, and hence to the 12V input of the second voltage converter 60. The first connection point 59 is buffered to high-voltage/first domain ground 56 via a third capacitor 78.

The transceiver device 100, as illustrated in FIG. 2, is for interfacing between at least two different voltage domains 12 and 14, which comprise namely the first supply voltage domain 12, which has a higher first supply voltage, and the second supply voltage domain 14, which has a lower second supply voltage. The transceiver device 100 has a first interface 110, which is supplied by the first supply voltage and is adapted to interface to at least one external first digital device 20 operating in the first supply voltage domain 12; and a second interface 120, which is supplied by the second supply voltage and is adapted to interface to an external communication bus 24 operating in the second supply voltage domain 14.

The transceiver device 100, as illustrated in FIG. 2, further has a first internal communication link 130, which is adapted to transfer transmit data, which are generatable by the external first digital device 20 operating in the first supply voltage domain 12, from the first interface 110 to the second interface 120; and a second internal communication link 170, which is adapted to transfer receive data, which may be supplied from the external communication bus 24 operating in the second supply voltage domain 14, from the second interface 120 to the first interface 110. The receive data may originate from a device that operates in the second supply voltage domain 14 and is connected to the communication bus 24.

The first and the second internal communication links 130 and 170 together enable bi-directional transmission of transmit data and receive data between a digital device 30, for example the microcontroller unit (MCU) 32, operating in the first (high) supply voltage domain 12 and the communication bus 24, for example a CAN bus, operating in the second (low) supply voltage domain 14.

The internal communication links 130, 170 are tolerant to ground offsets, common mode transients between the first supply voltage domain 12 (which may be embodied as the 12V/24V domain of the MHEV) and the second supply voltage domain 14 (which may be embodied as the 48V domain of the MHEV), and minimizes reverse currents into the CAN bus lines in loss of ground scenarios.

The transceiver device 100 according to the invention does not have nor needs a galvanic isolation barrier (see e.g. 98 in FIG. 1), for which one of the following methods are conventionally known: transformer, capacitor, or optocoupler. All these galvanic isolation barriers are expensive solutions, because according transceiver devices 96, e.g.

CAN transceivers, as shown in FIG. 1, consist of multiple integrated circuit dies in one package (multi-chip module package), or even worse and more expensive separate devices out of a transceiver device and one or more galvanic isolation devices may have to be applied.

Instead, the transceiver device 100 according to the invention has the first and second internal communication link 130 and 170, and may have more than one first and second internal communication links as mentioned above. As such, i.e. with all these components, the transceiver device 100 can be embodied as a monolithic integrated circuit.

With advantage, the monolithic integrated circuit, including in particular the first and second internal communication links 130 and 170, can be implemented in silicon-on-insulator (SOI) technology, in particular high-voltage SOI technology. This has been shown by internal feasibility studies performed by the inventors, whereas an implementation in e.g. CMOS technology is very difficult, if not impossible.

It is noted that the transceiver device 100 has at least two ground pins 114, 124, which include a ground pin of the first supply voltage (or first domain ground, $GND_{48}$) 114 that is adapted to be connected to a ground potential 56 of the first voltage supply domain 12, and a ground pin of the second supply voltage (or second domain ground, $GND_{12/24}$) 124 that is adapted to be connected to a ground potential 74 of the second voltage supply domain 14. As such, the transceiver device 100 may have a common mode and ground offset range from approximately ±3V to approximately ±70V.

The first supply voltage may be substantially nominal 48V or greater. The second supply voltage may be substantially nominal 12V or substantially nominal 24V. This enables the transceiver device 100 to be applicable in automotive applications, e.g. in Mild Electric Hybrid Vehicles (MEHV).

As is further illustrated in FIG. 2, the first interface 110 has a transmit data input 116 adapted to receive the transmit data, e.g. from the first digital device 20 operating in the first supply voltage domain 12, and a receive data output 118 adapted to transmit the receive data, e.g. to a second digital device 22 operating in the first supply voltage domain 12. Herein, the first and the second digital devices 20 and 22 operating in the first supply voltage domain 12 may be a same digital device 30. In addition or alternatively, the first and the second digital devices 20 and 22 operating in the first supply voltage domain 12 together may form a microcontroller unit 32.

As is still further illustrated in FIG. 2, the second interface 120 has a CAN high pin 126 and a CAN low pin 128, which together are adapted to transmit the transmit data to and/or to receive the receive data from the CAN bus as the external communication bus 24 operating in the second supply voltage domain 14. The communication bus 24 may be selected from the group consisting of a CAN bus, a Flexray bus, a LIN bus, and an Ethernet.

In the transceiver device 100 according to the invention, in respect of the transmission of transmit data and receive data, respectively, the first and the second internal communication link 130 and 170 may be based on differential voltage transmission, as will be explained further below with reference to FIG. 4.

Alternatively, in the transceiver device 100 according to the invention, in respect of the transmission of transmit data and receive data, respectively, the first and the second internal communication link 130 and 170 may be based on digital current loop transmission, as will be explained further below with reference to FIGS. 5 and 6.

The transceiver device 100 may be embodied as 48V CAN transceiver. As such and as is shown in FIG. 2, the transceiver device or 48V CAN transceiver 100 comprises in the first (high) voltage domain 12 the following pins: a supply input pin 112 for the first supply voltage (corresponding to $V_{IO}$ in FIG. 1), a ground pin 114 of the first supply voltage (or first domain ground, corresponding to $GND_{48}$ in FIG. 1), a transmit data input 116 (corresponding to TXD in FIG. 1), a receive data output 118 (corresponding to RXD in FIG. 1), and a mode port (not referenced) that connects via mode control signal line 38 to the microcontroller.

Furthermore, the transceiver device 100 as such comprises in the second (low) voltage domain 14 the following pins: a supply input pin 122 for the second supply voltage (corresponding to $BAT_{12}$ in FIG. 1) that connects to the a low-voltage/second domain supply 72, corresponding to $V_{BN12/24}$ in FIG. 1); a ground pin 124 of the second supply voltage (or second domain ground, corresponding to $GND_{12}$ in FIG. 1) that connects to the a low-voltage/second domain ground 74 (corresponding to $GND_{12/24}$ in FIG. 1); at least one communication bus pin, which is here (where the communication bus 24 is a CAN bus) embodied as a CAN high pin 126 and a CAN low pin 128; and a wake up port (not referenced) that connects to a wake-up voltage.

The low-voltage/second domain supply 72 ($V_{BN12/24}$) is connected to the supply input pin 122 for the second supply voltage ($BAT_{12}$) via a fifth diode 82. An output of the fifth diode 82 and/or the to the supply input pin 122 for the second supply voltage ($BAT_{12}$) is buffered to the second domain ground 124 via a third capacitor 84 and a fourth capacitor 86.

The 48V CAN transceiver further comprises in the second (low) voltage domain 14 the pins VBUF (not referenced) and INHN (not referenced). The VBUF is connected to an external buffer capacitor (or fifth capacitor) 94, which is used to stabilize the internal voltage supply of the CAN transceiver IP within the 48V CAN transceiver device. The INHN output is typically an open drain output, which is used for switching on and off, depending on the 48V CAN transceiver mode, an external supply circuit or device to supply the microcontroller unit 32. In the embodiment illustrated in FIG. 2, the INHN switches on and off the galvanic isolated flyback converter 70.

The wake-up voltage is connected, in the embodiment illustrated in FIG. 2, to the wake up port via a wake voltage line 92 comprising a first resistor 88, and to the second domain ground 124 via a second resistor 90. While the 48V CAN transceiver is in a low power mode, the WAKE pin can be used to detect a wake event, e.g. a rising edge on $V_{WAKE}$. After detection of a wake event, the 48V CAN transceiver will switch on, via the INHN output, the supply for the microcontroller unit 32. The circuitry inside and outside the transceiver device 100 connected to the WAKE pin may vary a lot, depending on the wake source, i.e. the source of $V_{WAKE}$.

Figure 3:
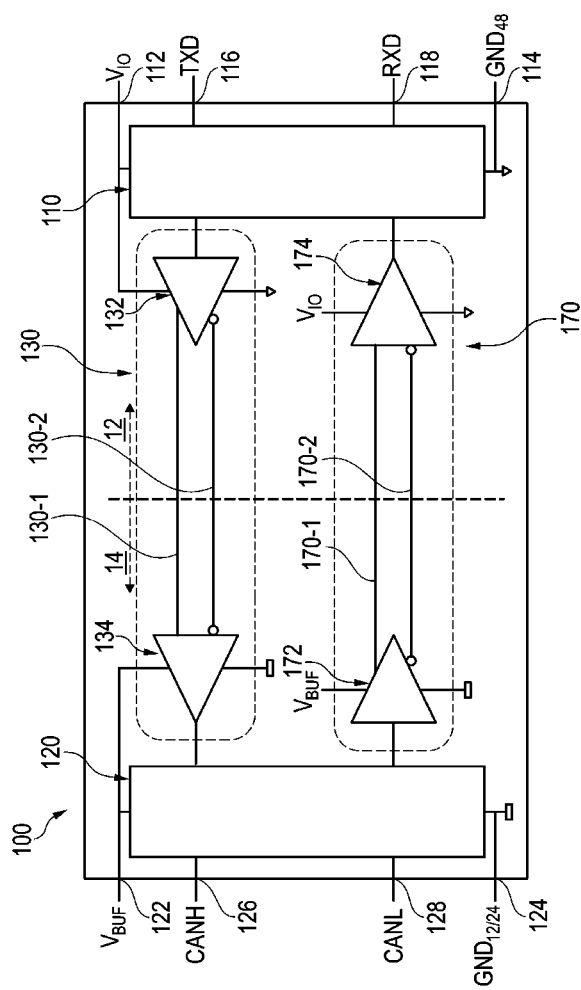
FIG. 3 shows a schematic block diagram, and illustrates a core function, of a transceiver device according to a first embodiment of the present invention, for interfacing between a first and a second supply voltage domain.

FIG. 3 shows a schematic block diagram, and illustrates a core function, of a transceiver device 100 according to a first embodiment of the present invention, for interfacing between a first and a second supply voltage domain 12, 14.

The transceiver device 100 has the first internal communication link 130, which comprises a first link transmitter 132, and a first link receiver 134, and which is capable to transfer the transmit data in the direction from the first interface 110 to the second interface 120. The transceiver device 100 further has the second internal communication link 170, which comprises a second link transmitter 172, and a second link receiver 174, and which is capable to transfer the receive data in the reverse direction from the second interface 120 to the first interface 110.

Figure 4:
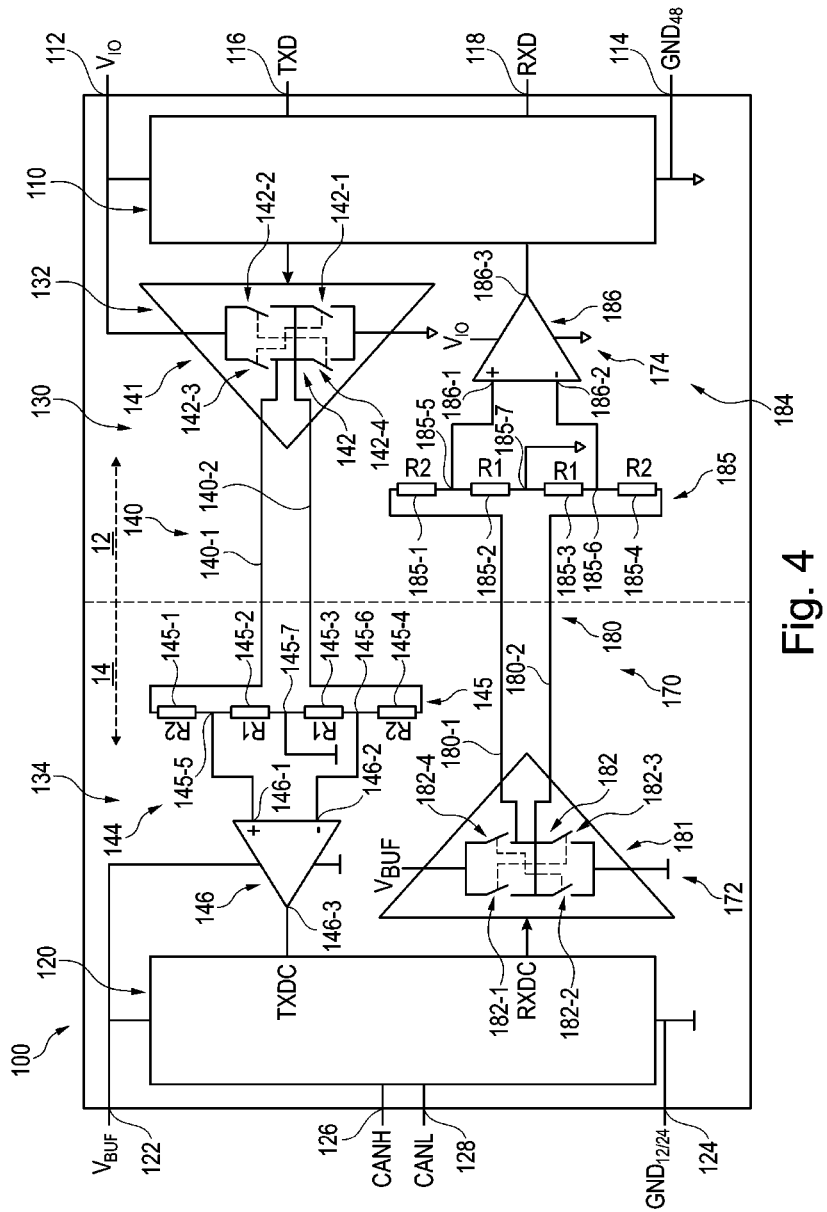
FIG. 4 shows a schematic block diagram, and illustrates a core function, of a transceiver device according to a second embodiment of the present invention, for interfacing between a first and a second supply voltage domain.

FIG. 4 shows a schematic block diagram, and illustrates a core function, of a transceiver device 100 according to a second embodiment of the present invention, for interfacing between a first and a second supply voltage domain 12 and 14, wherein the first and the second internal communication links 130 and 170 use the principle of differential voltage transmission for the transmission of, respectively, the transmit data and receive data.

In the embodiment illustrated in FIG. 4, the transceiver device 100, in respect of the transmission of transmit data and receive data, respectively, the first and the second internal communication link 130, 170 is indicated to be based on differential voltage transmission.

In the embodiment illustrated in FIG. 4, the first internal communication link 130 is embodied a first differential voltage transmission link 140. In the embodiment using differential voltage transmission, the first link transmitter 132 is embodied as a first differential voltage transmitter 141, which operates with reference to, in particular is supplied by, the first supply voltage domain 12. The first differential voltage transmitter 141 is adapted to receive, via the first interface 110, the transmit data generated by the first digital device 20 operating in the first supply voltage domain 12, and is further adapted to generate and output a first differential voltage signal for transmitting the transmit data. The first link receiver 134 is embodied as a first differential voltage receiver 144, which operates with reference to, in particular is supplied by, the second supply voltage domain 14. The first differential voltage receiver 144 is adapted to receive the differential voltage signal transmitted by the first differential voltage transmitter 141, and is further adapted to transmit a first single-ended digital signal for transmitting the transmit data, via the second interface 120, to the external communication bus 24, which operates in the second supply voltage domain 14 and is embodied as CAN bus having a CAN high line 26 and a CAN low line 28.

In the first differential voltage transmission link 140, the first differential voltage transmitter 141 has a first switch-based H-bridge 142, which operates with reference to, in particular is supplied by, the first supply voltage domain 12, and the first differential voltage receiver 144 has a first voltage divider resistor ladder 145 and a first comparator 146, which operates with reference to, in particular is supplied by, the second supply voltage domain 14.

As is illustrated in FIG. 4, the first switch-based H-bridge 142 comprises a first switch 142-1, a second switch 142-2, a third switch 142-3, and a fourth switch 142-4. The second switch 142-2 and the first switch 142-1 are connected in series, and the series connected second switch 142-2 and first switch 142-1 are connected between the first supply voltage $V_{IO}$, which is supplied via the supply input pin 112, and the first domain ground $GND_{48}$, which is supplied via the ground pin 114 of the first supply voltage. Likewise, the fourth switch 142-4 and the third switch 142-3 are connected in series, and the series connected fourth switch 142-4 and third switch 142-3 are connected between the first supply voltage $V_{IO}$, which is supplied via the supply input pin 112, and the first domain ground $GND_{48}$, which is supplied via the ground pin 114 of the first supply voltage. As such, the series connected second switch 142-2 and first switch 142-1 are connected in parallel to the series connected fourth switch 142-4 and third switch 142-3, between the first supply voltage $V_D$ and first domain ground $GND_{48}$. A first line 140-1 of the first differential communication link 140, or a first output of the first switch-based H-bridge 142, is connected to a connection point between the third switch 142-3 and the fourth switch 142-4. A second line 140-2 of the first communication link 140, or a second output of the first switch-based H-bridge 142, is connected to a connection point between the first switch 142-1 and the second switch 142-2.

As is further illustrated in FIG. 4, the first switch 142-1 and the third switch 142-3 are coupled in the sense that they are switched, i.e. opened and closed, simultaneously. Similarly, the second switch 142-2 and the fourth switch 142-4 are coupled in the sense that they are switched, i.e. opened and closed, simultaneously. An input signal to the first switch-based H-bridge 142 switches, upon transition to a high state (or low state), the mutually coupled first switch 142-1 and third switch 142-3 simultaneously on and the mutually coupled second switch 142-2 and fourth switch 142-4 off. On the contrary, the input signal to the first switch-based H-bridge 142 switches, upon transition to a low state (or high state), the mutually coupled first switch 142-1 and third switch 142-3 simultaneously off and the mutually coupled second switch 142-2 and fourth switch 142-4 on.

In operation, upon the input signal, which carries the transmit data, transitioning to a high state (or low state), the first output line 140-1 of the first differential communication link 140, assumes the potential of the first domain ground ($GND_{48}$) 114, and the second output line 140-2 of the first differential communication link 140, assumes the potential of the first supply voltage ($V_{IO}$) 112. Reversely, upon the input signal transitioning to a low state (or high state), the first output line 140-1 of the first differential communication link 140, assumes the potential of the first supply voltage ($V_{IO}$) 112, and the second output line 140-2 of the first differential communication link 140, assumes the potential of the first domain ground ($GND_{48}$) 114. Hence, the first line 140-1 of the first differential communication link 140 and the second line 140-2 of the first differential communication link 140 always have an "opposite potential" relative to each other, and as such the first differential communication link 140 transmits a differential voltage, which carries the transmit data.

As is further illustrated in FIG. 4, the first voltage divider resistor ladder 145 has, connected in series, a first resistor 145-1 having substantially a second resistance value R2, a second resistor 145-2 having substantially a first resistance value R1, a third resistor 145-3 having substantially the first resistance value R1, and a fourth resistor 145-4 having substantially the second resistance value R2. The ratio between the first resistance value and the second resistance value can be determined from the following equation:

$$(R2/R1) = (V1/V2) - 1,$$

wherein R1 is the first resistance value, R2 is the second resistance value, V1 is the nominal value of the first supply voltage, and V2 is the nominal value of the second supply voltage.

The first differential voltage signal, as output from the first switch-based H-bridge 142 via the first line 140-1 and the second line 140-2 of the first differential communication link 140, is applied across the series connection consisting of the first to fourth resistor 145-1 to 145-4. Then, a first auxiliary differential voltage signal is output by the first voltage divider resistor ladder 145 from between a first connection point 145-5 connected between the first and the second resistor 145-1 and 145-2 and a second connection point 145-6 connected between the third and the fourth resistor 145-3 and 145-4. A third connection point 145-7 connected between the second and the third resistor 145-2 and 145-3 is connected to the second domain ground ($GND_{12/24}$) 124.

The first comparator 146 has an input 146-1, an inverting input 146-2, and an output 146-3, and receives the first auxiliary differential voltage signal as applied to its input 146-1 and to its inverting input 146-2. The first comparator 146 outputs from its output 146-3 a first single-ended digital signal, which carries the transmit data.

Correspondingly, in the embodiment illustrated in FIG. 4, the second internal communication link 170 is embodied a second differential voltage transmission link 180. In the embodiment using differential voltage transmission, the second link transmitter 172 is embodied as a second differential voltage transmitter 181, which operates with reference to, in particular is supplied by, the second supply voltage domain 14. The second differential voltage transmitter 181 is adapted to receive, via the second interface 120, the receive data, which are supplied from the external communication bus 24 operating in the second supply voltage domain 14, and is further adapted to generate and output a second differential voltage signal for transmitting the receive data. The second link receiver 174 is embodied as a second differential voltage receiver 184, which operates with reference to, in particular is supplied by, the first supply voltage domain 12. The second differential voltage receiver 184 is adapted to receive the differential voltage signal transmitted by the second differential voltage transmitter 181, and is further adapted to transmit a second single-ended digital signal for transmitting the receive data, via the first interface 110, to the second digital device 22 operating in the first supply voltage domain 12.

In the second differential voltage transmission link 180, the second differential voltage transmitter 181 has a second switch-based H-bridge 182, which operates with reference to, in particular is supplied by, the second supply voltage domain 14, and the second differential voltage receiver 184 has a first voltage divider resistor ladder 185 and a first comparator 186, which operates with reference to, in particular is supplied by, the first supply voltage domain 12.

As is illustrated in FIG. 4, the second switch-based H-bridge 182 comprises a first switch 182-1, a second switch 182-2, a third switch 182-3, and a fourth switch 182-4. The first switch 182-1 and the second switch 182-2 are connected in series, and the series connected first switch 182-1 and second switch 182-2 are connected between the second supply voltage $V_{BUF}$, which is supplied via the supply input pin 122, and the second domain ground $GND_{12/24}$, which is supplied via the ground pin 124 of the second supply voltage. Likewise, the third switch 182-3 and the fourth switch 182-4 are connected in series, and the series connected third switch 182-3 and fourth switch 182-4 are connected between the second supply voltage $V_{BUF}$, which is supplied via the supply input pin 122, and the second domain ground $GND_{12/24}$, which is supplied via the ground pin 124 of the second supply voltage. As such, the series connected first switch 182-1 and second switch 182-2 are connected in parallel to the series connected third switch 182-3 and fourth switch 182-4, between second first supply voltage $V_{BUF}$ and second domain ground $GND_{12/24}$. A first line 180-1 of the second differential communication link 180, or a first output of the second switch-based H-bridge 182, is connected to a connection point between the third switch 182-3 and the fourth switch 182-4. A second line 180-2 of the second differential communication link 180, or a second output of the second switch-based H-bridge 182, is connected to a connection point between the first switch 182-1 and the second switch 182-2.

As is further illustrated in FIG. 4, the first switch 182-1 and the third switch 182-3 are coupled in the sense that they are switched, i.e. opened and closed, simultaneously. Similarly, the second switch 182-2 and the fourth switch 182-4 are coupled in the sense that they are switched, i.e. opened and closed, simultaneously. An input signal to the first switch-based H-bridge 182 switches, upon transition to a high state (or low state), the mutually coupled first switch 182-1 and third switch 182-3 simultaneously on and the mutually coupled second switch 182-2 and fourth switch 182-4 off. On the contrary, the input signal to the first switch-based H-bridge 182 switches, upon transition to a low state (or high state), the mutually coupled first switch 182-1 and third switch 182-3 simultaneously off and the mutually coupled second switch 142-2 and fourth switch 182-4 on.

In operation, upon the input signal, which carries the receive data, transitioning to a high state (or low state), the first output line 180-1 of the second differential communication link 180, assumes the potential of the second domain ground ($GND_{12/24}$) 124, and the second output line 180-2 of the second differential communication link 180, assumes the potential of the first supply voltage ($V_{BUF}$) 122. Reversely, upon the input signal transitioning to a low state (or high state), the first output line 180-1 of the second differential communication link 180, assumes the potential of the second supply voltage ($V_{BUF}$) 122, and the second output line 180-2 of the second differential communication link 180, assumes the potential of the second domain ground ($GND_{12/24}$) 124. Hence, the first line 180-1 of the second differential communication link 180 and the second line 180-2 of the second differential communication link 180 always have an "opposite potential" relative to each other, and as such the second differential communication link 180 transmits a differential voltage, which carries the receive data.

As is still further illustrated in FIG. 4, the second voltage divider resistor ladder 185 has, connected in series, a first resistor 185-1 having substantially a second resistance value R2, a second resistor 185-2 having substantially a first resistance value R1, a third resistor 185-3 having substantially the first resistance value, and a fourth resistor 185-4 having substantially the second resistance value. The ratio between the first resistance value and the second resistance value can be determined from the following equation:

$$(R2/R1)=(V1/V2)-1,$$

wherein R1 is the first resistance value, R2 is the second resistance value, V1 is the nominal value of the first supply voltage, and V2 is the nominal value of the second supply voltage.

The second differential voltage signal, as output from the second switch-based H-bridge 182, is applied across the series connection consisting of the first to fourth resistor 185-1 to 185-4. Then, a second auxiliary differential voltage signal is output by the second voltage divider resistor ladder 185 from between a first connection point 185-5 connected between the first and the second resistor 185-1 and 185-2 and a second connection point 185-6 connected between the third and the fourth resistor 185-3 and 185-4. A third connection point 185-7 connected between the second and the third resistor 185-2 and 185-3 is connected to the first domain ground ($GND_{48}$) 114.

The second comparator 186 has an input 186-1, an inverting input 186-2, and an output 186-3, and receives the second auxiliary differential voltage signal as applied to its input 186-1 and to its inverting input 186-2. The second comparator 186 outputs from its output 186-3 a second single-ended digital signal, which carries the receive data.

Figure 5:
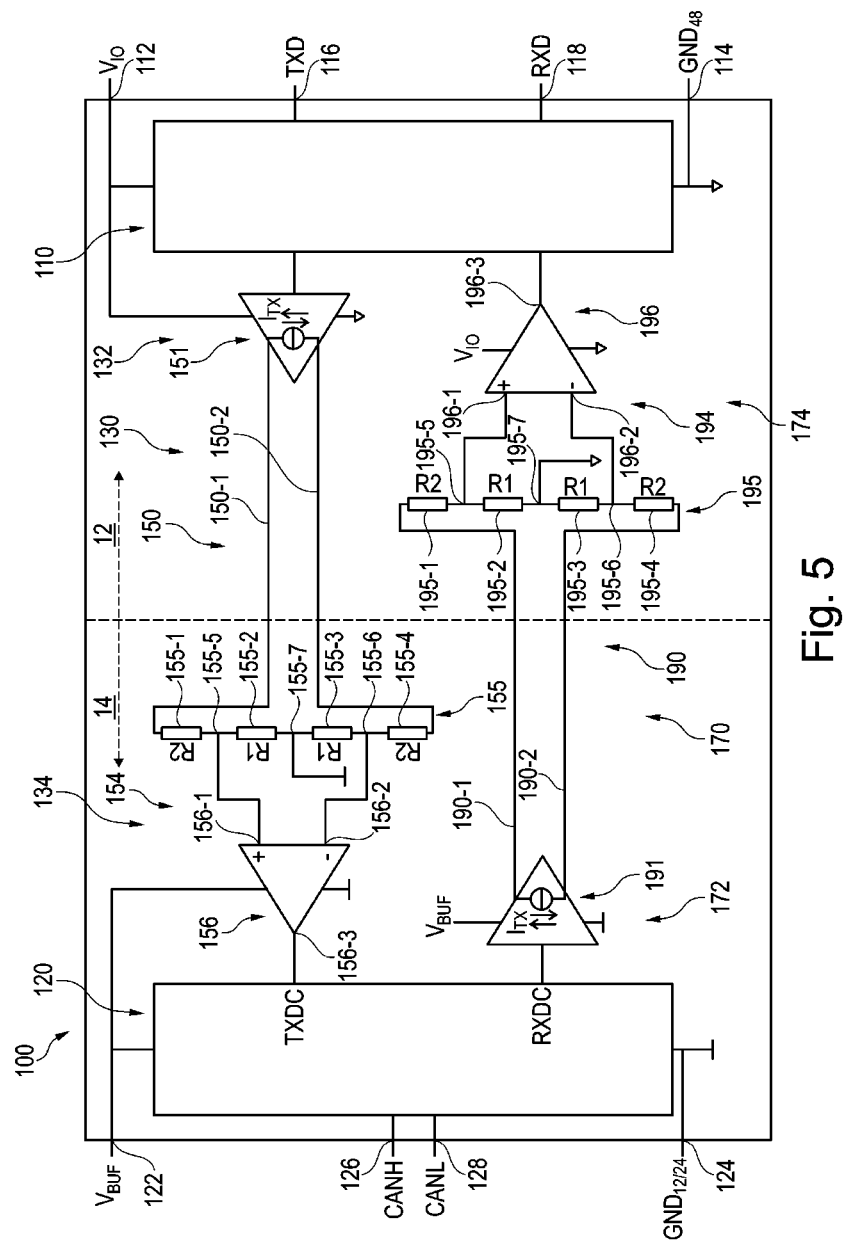
FIG. 5 shows a schematic block diagram, and illustrates a core function, of a transceiver device according to a third embodiment of the present invention, for interfacing between a first and a second supply voltage domain.

FIG. 5 shows a schematic block diagram, and illustrates a core function, of a transceiver device 100 according to a third embodiment of the present invention, for interfacing between a first and a second supply voltage domain 12 and 14, wherein the first and the second internal communication links 130 and 170 use the principle of digital current loop transmission for the transmission of, respectively, the transmit data and receive data.

In the embodiment illustrated in FIG. 5, the first internal communication link 130 is embodied as a first digital current loop transmission link 150, which has a first link transmitter 132 that is embodied a first transconductance transmitter 151. The first transconductance transmitter 151 operates with reference to, in particular is supplied by, the first supply voltage domain 12. The first transconductance transmitter 151 is adapted to receive, via the first interface 110, a first input voltage for carrying the transmit data generated by the first digital device 20 operating in the first supply voltage domain 12, and is further adapted to convert the first input voltage into, and output, a first differential current for transmitting the transmit data. The first differential current is in particular a two-way current, which is carried by the first line 150-1 and the second line 150-2 of the first digital current loop transmission link 150, to thereby form a two-way current loop, which is capable to represent dominant and recessive levels of a stream of transmit data. The first transconductance transmitter 151 may be based on an active H-bridge driver circuitry.

In the first digital current loop transmission link 150, the first link receiver 134 is embodied as a first digital differential current loop receiver 154, which operates with reference to, in particular is supplied by, the second supply voltage domain 14. The first digital differential current loop receiver 154 is adapted to receive the first differential current output, and is further adapted to convert this into, and output, a first single-ended digital signal for transmitting the transmit data, via the second interface 120, to the external communication bus 24 operating in the second supply voltage domain 14.

The first digital differential current loop receiver 154 has a first voltage divider resistor ladder 155 and a first differential current loop voltage comparator 156, which operates with reference to, in particular is supplied by, the second supply voltage domain 14.

The first voltage divider resistor ladder 155 has, connected in series, a first resistor 155-1 having substantially a second resistance value R2, a second resistor 155-2 having substantially a first resistance value R1, a third resistor 155-3 having substantially the first resistance value R1, and a fourth resistor 155-4 having substantially the second resistance value R2.

The first differential current signal, as output from the first transconductance transmitter 151, is applied across the series connection consisting of the first to fourth resistor 155-1 to 155-4. Then, a first auxiliary differential voltage signal is output by the first voltage divider resistor ladder 155 from between a first connection point 155-5 connected between the first and the second resistor 155-1 and 155-2 and a second connection point 155-6 connected between the third and the fourth resistor 155-3 and 155-4. A third connection point 155-7 between the second and the third resistor 155-2 and 155-3 may be connected to the second domain ground (GND$_{12/24}$) 124.

The first differential current loop voltage comparator 156 has an input 156-1, an inverting input 156-2, and an output 156-3, and receives the first auxiliary differential voltage signal as applied to its input 156-1 and to its inverting input 156-2. The first differential current loop voltage comparator 156 outputs from its output 156-3 a first single-ended digital signal, which carries the transmit data. The transmit data are then further transmitted through the second interface 120 to the external communication bus 24 operating in the second supply voltage domain 14.

A first voltage, V1, generated by the first differential current, I1_loop, flowing across the series connection consisting of the first to fourth resistors 155-1 to 155-4 and the first auxiliary voltage, V1_aux, can be determined from the following equations:

$$V1=2*(R1+R2)*I1\_loop, \text{ and}$$

$$V1\_aux=2*R1*I1\_loop,$$

wherein R1 is the first resistance value, and R2 is the second resistance value.

Correspondingly, in the embodiment illustrated in FIG. 5, the second internal communication link 170 is embodied as a second digital current loop transmission link 190, which has a second link transmitter 172 that is embodied as a second transconductance transmitter 191. The second transconductance transmitter 191 operates with reference to, in particular is supplied by, the second supply voltage domain 12. It is further adapted to receive, via the second interface 120, a second input voltage for carrying the receive data, which are supplied from the external communication bus 24 operating in the second supply voltage domain 14, and is further adapted to convert the second input voltage into, and output, a second differential, in particular two-way, current output for transmitting the receive data. Also the second differential current is in particular a two-way current, which is carried by the first line 190-1 and the second line 190-2 of the second digital current loop transmission link 190, to thereby form a two-way current loop, which is capable to represent dominant and recessive levels of a stream of receive data. The second transconductance transmitter 191 may be based on an active H-bridge driver circuitry.

Further correspondingly, in the embodiment illustrated in FIG. 5, the second digital current loop transmission link 190 has a second link receiver 174 that is embodied as a second digital differential current loop receiver 194.

The second digital differential current loop receiver 194 is adapted to receive the second differential current output, and is further adapted to convert this into, and output, a second single-ended digital signal for transmitting the receive data, via the first interface 110, to the second digital device 22 operating in the first supply voltage domain 12.

The second digital differential current loop receiver 194 has a second voltage divider resistor ladder 195 and a second differential current loop voltage comparator 196, which operates with reference to, in particular is supplied by, the first supply voltage domain 12.

The second voltage divider resistor ladder 195 has, connected in series, a first resistor 195-1 having substantially a second resistance value R2, a second resistor 195-2 having substantially a first resistance value R1, a third resistor 195-3 having substantially the first resistance value, and a fourth resistor 195-4 having substantially the second resistance value.

The second differential current signal, as output from the second transconductance transmitter 191, is applied across the series connection consisting of the first to fourth resistor 195-1 to 195-4. Then, a second auxiliary differential voltage signal is output by the second voltage divider resistor ladder 195 from between a first connection point 195-5 connected between the first and the second resistor 195-1 and 195-2 and a second connection point 195-6 connected between the third and the fourth resistor 195-3 and 195-4. A third connection point 195-7 between the second and the third resistor 195-2 and 195-3 may be connected to the first domain ground ($GND_{48}$) 114.

A second voltage, V2, generated by the second differential current, I2_loop, flowing across the series connection consisting of the first to fourth resistors (195-1, ..., 195-4) and the second auxiliary voltage, V2_aux, can be determined from the following equations:

$$V2=2*(R1+R2)*I2\_loop, \text{ and}$$

$$V2\_aux=2*R1*I2\_loop,$$

wherein R1 is the first resistance value, and R2 is the second resistance value.

The second differential current loop voltage comparator 196 has an input 196-1, an inverting input 196-2, and an output 196-3, and receives the first auxiliary differential voltage signal as applied to its input 196-1 and to its inverting input 196-2. The second differential current loop voltage comparator 196 outputs from its output 196-3 a second single-ended digital signal, which carries the receive data. The receive data are then further transmitted through the first interface 110 to the second digital device 22 operating in the first supply voltage domain 12.

Figure 6:
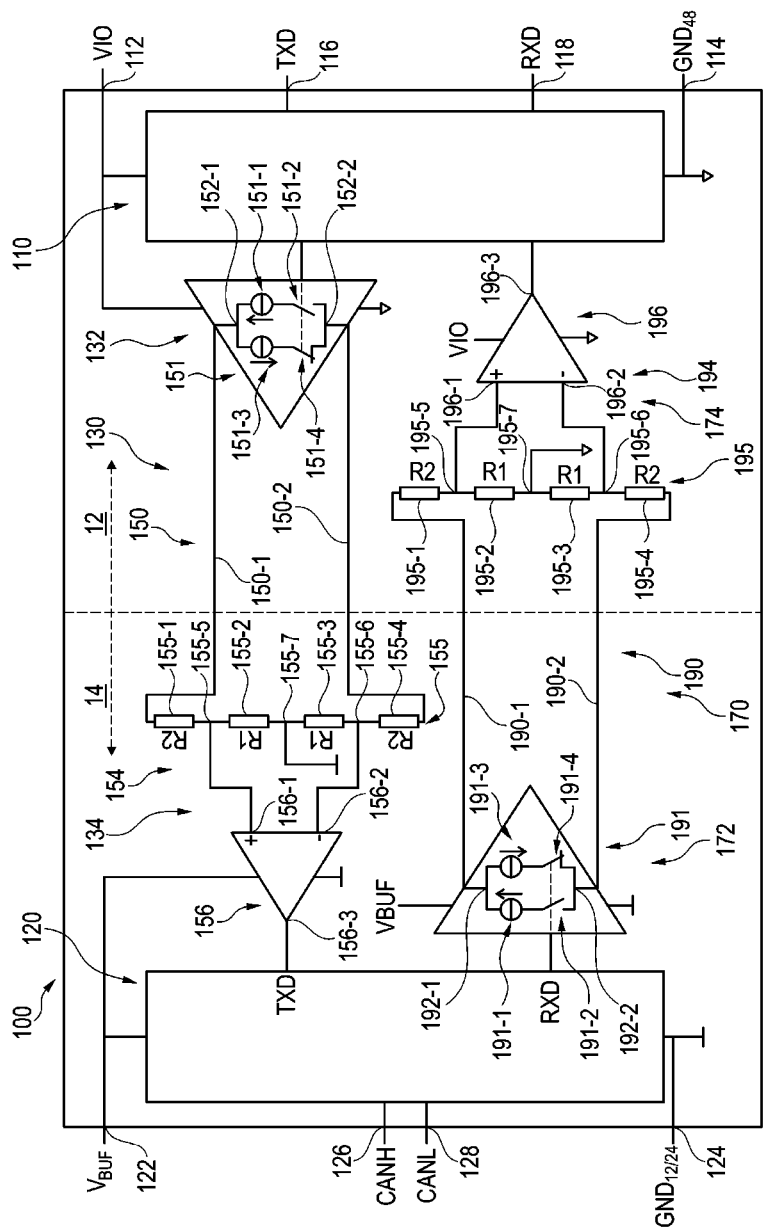
FIG. 6 shows a schematic block diagram, and illustrates a core function, of a transceiver device according to the third embodiment of the present invention illustrated in FIG. 5, showing details of the first and second transconductance transmitters.

FIG. 6 shows a schematic block diagram, and illustrates a core function, of a transceiver device 100 according to the third embodiment of the present invention illustrated in FIG. 5, showing details of the first and second transconductance transmitters 151, 191.

The first transconductance transmitter 151 has a first branch having, connected in series, a first current source 151-1 adapted to generate a first electric current and a first switch 151-2, and a second branch having, connected in series, a second current source 151-3 adapted to generate a second electric current and a second switch 151-4. The first branch and the second branch are connected in parallel between a first connection point 152-1 and a second connection point 152-2. The second electric current is directed opposite to the first electric current. The first connection point 152-1 represents a first output that connects to a first output line 150-1 of the first digital current loop communication link 150, and the second connection point 152-2 represents a second output that connects to a second output line 150-2 of the first digital current loop communication link 150, which transfers the transmit data from the first interface 110 to the second interface 120.

The second transconductance transmitter 191 has a first branch having, connected in series, a first current source 191-1 adapted to generate a first electric current and a first switch 191-2, and a second branch having, connected in series, a second current source 191-3 adapted to generate a second electric current and a second switch 191-4. The first branch and the second branch are connected in parallel between a first connection point 192-1 and a second connection point 192-2. The second electric current is directed opposite to the first electric current. The first connection point 192-1 represents a first output that connects to a first output line 190-1 of the second digital current loop communication link 190, and the second connection point 192-2 represents a second output that connects to a second output line 190-2 of the second digital current loop communication link 190, which transfers the receive data from the second interface 120 to the first interface 110.

In this specification, example embodiments have been presented in terms of a selected set of details. However, a person of ordinary skill in the art would understand that many other example embodiments may be practiced which include a different selected set of these details. It is intended that the following claims cover all possible example embodiments.

Supplementary, it is to be noted that "having" or "comprising" does not exclude other elements or steps, and that "a" or "an" does not exclude a plurality. In addition, it is to be noted that features or steps, which have been described above with reference to one of the above embodiment examples, may also be used in combination with other features or steps of other embodiment examples that have been described above. Reference numerals in the claims are not to be construed as limitations.

LIST OF REFERENCE NUMERALS 10 electrical network system, e.g. electronic control unit
12 first supply voltage domain
14 second supply voltage domain
20 first digital device operating in the first supply voltage domain
22 second digital device operating in the first supply voltage domain
24 communication bus, e.g. CAN bus
26 CAN bus high line
28 CAN bus low line
30 same digital device operating in the first supply voltage domain
32 microcontroller unit (MCU)
34 transmit data line
36 receive data line
38 mode control signal line
40 first control signal line
42 gate driver unit (GDU)
44 second control signal line
46 power stage
48 drive signal line
50 electric drive motor
52 first voltage converter, e.g. 48V/12V
54 high-voltage/first domain supply e.g. nominal 48V car board net supply/$V_{BN48}$ (Kl. 40)
56 high-voltage/first domain ground e.g. ground connector of 48V car board net/$GND_{48}$ (Kl. 41)
58 first diode
60 second voltage converter, e.g. 12V/VDD1
62 first capacitor
64 second capacitor
70 galvanic isolated flyback converter
72 low-voltage/second domain supply e.g. nominal 12V or 24V car board net supply/$V_{BN12/24}$ (Kl. 30)
74 low-voltage/second domain ground e.g. ground connector of 12V or 24V car board net/$GND_{12/24}$ (Kl. 31)
76 second diode
78 third capacitor
80 fourth diode
82 fifth diode
84 third capacitor
86 fourth capacitor
87 third voltage converter, e.g. 12V/VDD2 or 24V/VDD2
88 first resistor
90 second resistor 92 wake voltage line
94 fifth capacitor/buffer capacitor
96 transceiver device (state of the art)
98 galvanic isolation barrier
100 transceiver device
110 first (digital) interface
112 supply input pin for first supply voltage/Vic)
114 ground pin of first supply voltage/first domain ground/ $GND_{48}$
116 transmit data input (pin)
118 receive data output (pin)
120 second interface/e.g. CAN bus interface
122 supply input pin for second supply voltage/$V_{BUF}$
124 ground pin of second supply voltage/second domain ground/$GND_{12/24}$
126 CAN high pin
128 CAN low pin
130 first internal communication link
130-1 first line of first link
130-2 second line of first link
132 first link transmitter
134 first link receiver
140 first differential voltage communication link
140-1 first line of first link
140-2 second line of first link
141 first differential voltage transmitter
142 first switch-based H-bridge
142-1 first switch
142-2 second switch
142-3 third switch
142-4 fourth switch
144 first differential voltage receiver
145 first voltage divider resistor ladder
145-1 first resistor
145-2 second resistor
145-3 third resistor
145-4 fourth resistor
145-5 first connection point
145-6 second connection point
145-7 centre connection point
146 first comparator
146-1 input
146-2 inverting input
146-3 output
150 first digital current loop communication link
150-1 first line of first link
150-2 second line of first link
151 first transconductance transmitter
151-1 first current source
151-2 first switch
151-3 second current source
151-4 second switch
152-1 first connection point
152-2 second connection point
154 first digital differential current loop receiver
155 first (differential current loop voltage) divider resistor ladder
155-1 first resistor
155-2 second resistor
155-3 third resistor
155-4 fourth resistor
155-5 first connection point
155-6 second connection point
155-7 centre connection point
156 first (differential current loop voltage) comparator
156-1 input
156-2 inverting input
156-3 output
170 second internal communication link
170-1 first line of second link
170-2 second line of second link
172 second link transmitter
174 second link receiver
180 second differential voltage communication link
180-1 first line of second link
180-2 second line of second link
181 second differential voltage transmitter
182 second switch-based H-bridge
182-1 first switch
182-2 second switch
182-3 third switch
182-4 fourth switch
184 second differential voltage receiver
185 second voltage divider resistor ladder
185-1 first resistor
185-2 second resistor
185-3 third resistor
185-4 fourth resistor
185-5 first connection point
185-6 second connection point
185-7 centre connection point
186 second comparator
186-1 input
186-2 inverting input
186-3 output
190 second digital current loop communication link
190-1 first line of second link
190-2 second line of second link
191 second transconductance transmitter
191-1 first current source
191-2 first switch
191-3 second current source
191-4 second switch
192-1 first connection point
192-2 second connection point
194 second digital differential current loop receiver
195 second (differential current loop voltage) divider resistor ladder
195-1 first resistor
195-2 second resistor
195-3 third resistor
195-4 fourth resistor
195-5 first connection point
195-6 second connection point
195-7 centre connection point
196 second (differential current loop voltage) comparator
196-1 input
196-2 inverting input
196-3 output

The invention claimed is:
1. A transceiver device for interfacing between at least a first supply voltage domain having a first supply voltage and at least a second supply voltage domain having a second supply voltage that is either greater than or less than the first supply voltage, wherein the transceiver device has:
a first interface, which is supplied by the first supply voltage and is adapted to interface to at least one external first digital device operating in the first supply voltage domain;
a second interface, which is supplied by the second supply voltage and is adapted to interface to an external communication bus operating in the second supply voltage domain;

a first internal communication link, which is adapted to transfer transmit data, which are generatable by the external first digital device operating in the first supply voltage domain, from the first interface to the second interface; and
a second internal communication link, which is adapted to transfer receive data, which are supplyable from the external communication bus operating in the second supply voltage domain, from the second interface to the first interface; and
wherein the first internal communication link comprises:
a first voltage transmitter which operates with reference to the first supply voltage domain and is adapted to receive, via the first interface, the transmit data generated by the first digital device operating in the first supply voltage domain, and to generate and output a first voltage signal for transmitting the transmit data; and
a first voltage receiver which operates with reference to the second supply voltage domain and is adapted to receive the voltage signal transmitted by the first voltage transmitter, and to transmit a first digital signal for transmitting the transmit data, via the second interface, to the external communication bus second digital device operating in the second supply voltage domain.

2. The transceiver device according to claim 1, having at least one feature selected from the the following list of features:
i) the transceiver device is embodied as a monolithic integrated circuit;
ii) the transceiver device has at least two ground pins, including a first ground pin adapted to be connected to a ground potential of the first voltage supply domain, and a second ground pin adapted to be connected to a ground potential of the second voltage supply domain;
iii) the transceiver device has a common mode and ground offset range that is in a range starting from more than ±3V, but not exceeding ±70V;
iv) the first supply voltage is approximately 48V;
v) the second supply voltage is approximately 12V or approximately 24V.

3. The transceiver device according to claim 1, wherein the first interface has:
a transmit data input adapted to receive the transmit data from the first digital device operating in the first supply voltage domain; and
a receive data output adapted to transmit the receive data to a second digital device operating in the first supply voltage domain.

4. The transceiver device according to claim 3,
wherein the first and the second digital device operating in the first supply voltage domain are a same digital device; and/or
wherein the first and the second digital device operating in the first supply voltage domain together form a microcontroller unit.

5. The transceiver device according to claim 1, wherein the second interface has at least one communication bus pin adapted to transmit the transmit data to and/or receive the receive data from the communication bus operating in the second supply voltage domain.

6. The transceiver device according to claim 5,
wherein the external communication bus operating in the second supply voltage domain is selected from the group consisting of a CAN bus, a Flexray bus, a LIN bus, and an Ethernet.

7. The transceiver device according to claim 1,
wherein the first internal communication link is configured to operate using differential voltage transmission;
wherein the first voltage transmitter is a first differential voltage transmitter that is configured to generate and output a differential voltage signal as the first voltage signal and
wherein the first voltage receiver is a first differential voltage receiver configured to transmit a first single-ended digital signal as the first digital signal.

8. The transceiver device according to claim 7,
wherein the second internal communication link is configured to operate using differential voltage transmission; and
wherein the second internal communication link comprises;
a second differential voltage transmitter which operates with reference to the second supply voltage domain, which is adapted to receive, via the second interface, the receive data supplyable from the external communication bus operating in the second supply voltage domain, and to generate and output a second differential voltage signal for transmitting the receive data; and
a second differential voltage receiver, which operates with reference to the first supply voltage domain, which is adapted to receive the differential voltage signal transmitted by the second differential voltage transmitter, and to transmit a second single-ended digital signal for transmitting the receive data, via the first interface, to a second digital device operating in the first supply voltage domain.

9. The transceiver device according to claim 7,
wherein the first differential voltage transmitter has a first switch-based H-bridge, which operates with reference to, and is supplied by, the first supply voltage domain;
wherein the first differential voltage receiver has a first voltage divider resistor ladder and a first comparator, which operates with reference to, and is supplied by, the second supply voltage domain;
wherein the first voltage divider resistor ladder has, connected in series, a first resistor having substantially a second resistance value, a second resistor having substantially a first resistance value, a third resistor having substantially the first resistance value, and a fourth resistor having substantially the second resistance value;
wherein the first differential voltage signal, as output from the first switch-based H-bridge, is applied across the in-series connection consisting of the first to fourth resistor, wherein a first auxiliary differential voltage signal is output by the first voltage divider resistor ladder from between a first connection point connected between the first and the second resistor and a second connection point connected between the third and the fourth resistor;
wherein the first comparator has a non-inverting input, an inverting input, and an output, and receives the first auxiliary differential voltage signal as applied to its non-inverting input and to its inverting input, and outputs from its output the first single-ended digital signal; and
wherein a ratio between the first resistance value and the second resistance value is equal to:

$$(R2/R1)=(V1/V2)-1,$$

wherein R1 is the first resistance value, R2 is the second resistance value, V1 is a specification voltage of the first supply voltage, and V2 is a specification voltage of the second supply voltage that is lower than V1.

10. The transceiver device according to claim 7,
wherein the second differential voltage transmitter has a second switch-based H-bridge, which operates with reference to, and is supplied by, the second supply voltage domain; and
the second differential voltage receiver has a second voltage divider resistor ladder and a second comparator, which operates with reference to, and is supplied by, the first supply voltage domain;
wherein the second voltage divider resistor ladder has, connected in series, a first resistor having substantially a second resistance value, a second resistor having substantially a first resistance value, a third resistor having substantially the first resistance value, and a fourth resistor having substantially the second resistance value;
wherein the second differential voltage signal, as output from the second switch-based H-bridge, is applied across the in-series connection consisting of the first to fourth resistor, wherein a second auxiliary differential voltage signal is output by the second voltage divider resistor ladder from between a first connection point connected between the first and the second resistor and a second connection point connected between the third and the fourth resistor; and
wherein the second comparator has a non-inverting input, an inverting input, and an output, and receives the second auxiliary differential voltage signal as applied to its non-inverting input and to its inverting input, and outputs from its output the second single-ended digital signal; and
wherein a ratio between the first resistance value and the second resistance value is equal to:

$$(R2/R1)=(V1/V2)-1,$$

where R1 is the first resistance value, R2 is the second resistance value, V1 is a specification voltage of the first supply voltage, and V2 is a specification voltage of the second supply voltage that is lower than V1.

11. The transceiver device according to claim 1,
wherein the first and the second internal communication links are configured to operate using digital current loop transmission; and
wherein the first voltage transmitter is a first transconductance transmitter which operates with reference to the first supply voltage domain and is adapted to receive, via the first interface, a first input voltage for carrying the transmit data generated by the first digital device operating in the first supply voltage domain, and to convert the first input voltage into, and output, a two-way first differential current output for transmitting the transmit data, and
a first digital differential current loop receiver, which operates with reference to, and is supplied by, the second supply voltage domain, which is adapted to receive the first differential current output, and to convert this into, and output, a first single-ended digital signal for transmitting the transmit data, via the second interface, to the external communication bus operating in the second supply voltage domain.

12. The transceiver device according to claim 11, wherein the second internal communication link comprises:

a second transconductance transmitter, which operates with reference to the second supply voltage domain and is adapted to receive, via the second interface, a second input voltage for carrying the receive data supplyable from the external communication bus operating in the second supply voltage domain, and to convert the second input voltage into, and output, a two-way second differential current output for transmitting the receive data; and
a second digital differential current loop receiver, which operates with reference to, and is supplied by, the first supply voltage domain, which is adapted to receive the second differential current output, and to convert this into, and output, a second single-ended digital signal for transmitting the receive data, via the first interface, to the second digital device operating in the first supply voltage domain.

13. The transceiver device according to claim 11,
wherein the second supply voltage is lower than the first supply voltage;
wherein the first transconductance transmitter has a first branch having, connected in series, a first current source adapted to generate a first electric current and a first switch, and a second branch having, connected in series, a second current source adapted to generate a second electric current and a second switch, wherein the first branch and the second branch are connected in parallel between a first connection point and a second connection point, wherein the second electric current is directed opposite to the first electric current, wherein the first connection point represents a first output that connects to a first line of the first internal communication link, and the second connection point represents a second output that connects to a second line of the first internal communication link;
wherein the first digital differential current loop receiver has a first voltage divider resistor ladder and a first differential current loop voltage comparator, which operates with reference to, and is supplied by, the second supply voltage domain;
wherein the first voltage divider resistor ladder has, connected in series, a first resistor having substantially a second resistance value, a second resistor having substantially a first resistance value, a third resistor having substantially the first resistance value, and a fourth resistor having substantially the second resistance value;
wherein the first differential current ("I1_loop"), as output from the first output and the second output of the first transconductance transmitter, is applied across the series connection consisting of the first to fourth resistor, wherein a first auxiliary differential voltage, ("V1_aux"), is output by the first voltage divider resistor ladder from between a first connection point connected between the first and the second resistor and a second connection point connected between the third and the fourth resistor;
wherein the first differential current loop voltage comparator has a non-inverting input, an inverting input, and an output, and receives the first auxiliary differential voltage signal as applied to its non-inverting input and to its inverting input, and outputs from its output the first single-ended digital signal; and
in particular wherein a first voltage ("V1") generated by the first differential current (I1_loop) flowing across the series connection consisting of the first to fourth resistors and the first auxiliary voltage (V1_aux), is defined by determined from the following equations:

$$V1=2*(R1+R2)*I1\_loop, \text{ and}$$

$$V1\_aux=2*R1*I1\_loop,$$

where R1 is the first resistance value, and R2 is the second resistance value.

14. The transceiver device according to claim 11,
wherein the second supply voltage is lower than the first supply voltage;
wherein the second transconductance transmitter has a first branch having, connected in series, a first current source adapted to generate a first electric current and a first switch, and a second branch having, connected in series, a second current source adapted to generate a second electric current and a second switch, wherein the first branch and the second branch are connected in parallel between a first connection point and a second connection point, wherein the second electric current is directed opposite to the first electric current, wherein the first connection point represents a first output that connects to a first line of the second internal communication link, and the second connection point represents a second output that connects to a second line of the second internal communication link;
wherein the second digital differential current loop receiver has a second voltage divider resistor ladder and a second differential current loop voltage comparator, which operates with reference to, and is supplied by, the second supply voltage domain;
wherein the second voltage divider resistor ladder has, connected in series, a first resistor having substantially a second resistance value, a second resistor having substantially a first resistance value, a third resistor having substantially the first resistance value, and a fourth resistor having substantially the second resistance value;
wherein the second differential current ("I2_loop"), as output from the second transconductance transmitter, is applied across the series connection consisting of the first to fourth resistor, wherein a second auxiliary differential voltage ("V2_aux") is output by the second voltage divider resistor ladder from between a first connection point connected between the first and the second resistor and a second connection point connected between the third and the fourth resistor;
wherein the second differential current loop voltage comparator has a non-inverting input, an inverting input, and an output, and receives the first auxiliary differential voltage signal as applied to its non-inverting input and to its inverting input, and outputs from its output the first single-ended digital signal; and
wherein a second voltage ("V2") generated by the second differential current (I2_loop) flowing across the series connection consisting of the first to fourth resistors and the second auxiliary voltage (V2_aux) can be determined from is defined by the following equations:

$$V2=2*(R1+R2)*I2\_loop, \text{ and}$$

$$V2\_aux=2*R1*I2\_loop,$$

where R1 is the first resistance value and R2 is the second resistance value.

15. A vehicle having an electrical network system including an electronic control unit, wherein the electrical network system has a first supply voltage domain and a second supply voltage domain having a lower supply voltage than the first supply voltage domain, and a transceiver device according to claim 1 for interfacing between the first and the second supply voltage domains.

16. The transceiver device according to claim 1, wherein the transceiver device has at least two ground pins, including a first ground pin adapted to be connected to a ground potential of the first voltage supply domain, and a second ground pin adapted to be connected to a ground potential of the second voltage supply domain.

17. The transceiver device according to claim 1, wherein the transceiver device has a common mode and ground offset range that is in a range starting from more than ±3V, but not exceeding ±70V.

* * * * *